United States Patent [19]
Bos et al.

[11] Patent Number: 6,139,172
[45] Date of Patent: Oct. 31, 2000

[54] INTERIOR MIRROR ASSEMBLY FOR A VEHICLE INCORPORATING A SOLID-STATE LIGHT SOURCE

[75] Inventors: Brent J. Bos, Zeeland; Stephen J. Forbes, Wyoming; Roger L. Veldman, Holland, all of Mich.

[73] Assignee: Donnelly Corporation, Holland, Mich.

[21] Appl. No.: 09/287,926

[22] Filed: Apr. 7, 1999

Related U.S. Application Data

[63] Continuation of application No. 08/937,480, Sep. 25, 1997, Pat. No. 5,938,321, which is a continuation of application No. 08/367,844, Dec. 30, 1994, Pat. No. 5,671,996.

[51] Int. Cl.⁷ .................................. B60Q 3/02; B60R 1/04
[52] U.S. Cl. .......................... 362/494; 362/230; 362/295; 362/545; 362/800
[58] Field of Search .................................... 362/230, 231, 362/295, 490, 492, 494, 503, 504, 545, 800

[56] References Cited

U.S. PATENT DOCUMENTS

| | | | |
|---|---|---|---|
| 2,060,401 | 11/1936 | Smith | 362/540 |
| 2,190,123 | 2/1940 | Pace | 362/503 |
| 2,595,331 | 5/1952 | Calihan et al. | 362/494 |
| 3,436,758 | 4/1969 | Kluth | 340/425 |
| 3,543,018 | 11/1970 | Barcus et al. | 362/144 |
| 3,589,662 | 6/1971 | Lagrange | 248/549 |
| 3,665,392 | 5/1972 | Annas | 340/479 |
| 4,040,726 | 8/1977 | Paca | 359/636 |
| 4,499,451 | 2/1985 | Suzuki et al. | 362/494 |
| 4,516,197 | 5/1985 | Yonkers | 362/342 |
| 4,588,267 | 5/1986 | Pastore | 359/636 |
| 4,626,967 | 12/1986 | Segoshi | 362/503 |
| 4,630,904 | 12/1986 | Pastore | 359/636 |
| 4,733,336 | 3/1988 | Skogler et al. | 362/142 |

(List continued on next page.)

FOREIGN PATENT DOCUMENTS

| | | |
|---|---|---|
| 0165817 | 12/1985 | European Pat. Off. . |
| 0254435 | 1/1988 | European Pat. Off. . |
| 615882 A2 | 9/1994 | European Pat. Off. . |
| 1021987 | 2/1953 | France . |
| 1311945 | 3/1963 | France . |
| 2332885 | 1/1975 | Germany . |
| 3614882 | 11/1987 | Germany . |
| 2210836 | 6/1989 | United Kingdom . |
| 9412368 | 6/1994 | WIPO . |

OTHER PUBLICATIONS

Lamper, Carl M. and Granqvist, Claes G., "Large–Area Chromogenics: Materials and Devices for Transmittance Control," SPIE Institutes for Advanced Optical Technologies, vol. IS 4, SPIE Optical Engineering Press, Sep. 22, 1988, pp. 46–84, "Automotive Applications of Chromogenic Materials," by Niall R. Lynam and Anoop Agrawal, Donnelly Corporation, Holland, Michigan, U.S.A.

Lynam, N. R., "Electrochromic Automotive Day/Night Mirrors," *SAE Technical Paper Series*, 870636 (1987).

Lynam, N. R., "Smart Windows for Automobiles," *SAE Technical Paper Series*, 900419 (1990).

*Primary Examiner*—Alan Cariaso
*Attorney, Agent, or Firm*—Van Dyke, Gardner, Linn, Burkhart, LLP

[57] ABSTRACT

Interior vehicle intense local illumination of a target location of a vehicle interior is provided by an interior rearview mirror assembly incorporating a solid-state light source which emits light generally downwardly from the bottom of the assembly. Preferably, the solid-state light source consists of a grouping of multiple light emitting diodes. At least one light emitting diode preferably has a luminous intensity of at least 500 mcd when operated at a forward current of 20 mA, emits light with a dominant wavelength within the range of about 530 nm to about 680 nm, emits light having a color selected from green, orange, yellow, amber, reddish-orange, red and blue, is formed from a material including at least one of aluminum, indium, gallium arsenic and phosphorous, and may be connected by a series resistor to the vehicle ignition/battery.

39 Claims, 7 Drawing Sheets

U.S. PATENT DOCUMENTS

| | | | |
|---|---|---|---|
| 4,781,436 | 11/1988 | Armbruster | 359/606 |
| 4,791,534 | 12/1988 | Lindberg | 362/516 |
| 4,793,690 | 12/1988 | Gahan et al. | 359/604 |
| 4,799,768 | 1/1989 | Gahan | 359/604 |
| 4,807,096 | 2/1989 | Skogler et al. | 362/142 |
| 4,826,289 | 5/1989 | Vandenbrink et al. | 359/606 |
| 4,864,473 | 9/1989 | Tokarz et al. | 362/490 |
| 4,936,533 | 6/1990 | Adams et al. | 248/222.1 |
| 4,943,796 | 7/1990 | Lee | 362/494 |
| 4,948,242 | 8/1990 | Desmond et al. | 359/877 |
| 5,014,167 | 5/1991 | Roberts | 362/494 |
| 5,100,095 | 3/1992 | Haan et al. | 248/549 |
| 5,140,455 | 8/1992 | Varaprasad et al. | 359/275 |
| 5,151,816 | 9/1992 | Varaprasad et al. | 359/275 |
| 5,178,448 | 1/1993 | Adams et al. | 362/494 |
| 5,193,029 | 3/1993 | Schofield et al. | 359/604 |
| 5,202,787 | 4/1993 | Byker et al. | 359/267 |
| 5,253,109 | 10/1993 | O'Farrell | 359/604 |
| 5,327,288 | 7/1994 | Wellington et al. | 359/606 |
| 5,439,305 | 8/1995 | Santo | 248/475.1 |
| 5,575,552 | 11/1996 | Faloon et al. | 362/494 |
| 5,576,687 | 11/1996 | Blank et al. | 340/438 |
| 5,615,857 | 4/1997 | Hook | 248/549 |
| 5,659,423 | 8/1997 | Schierbeek et al. | 359/604 |

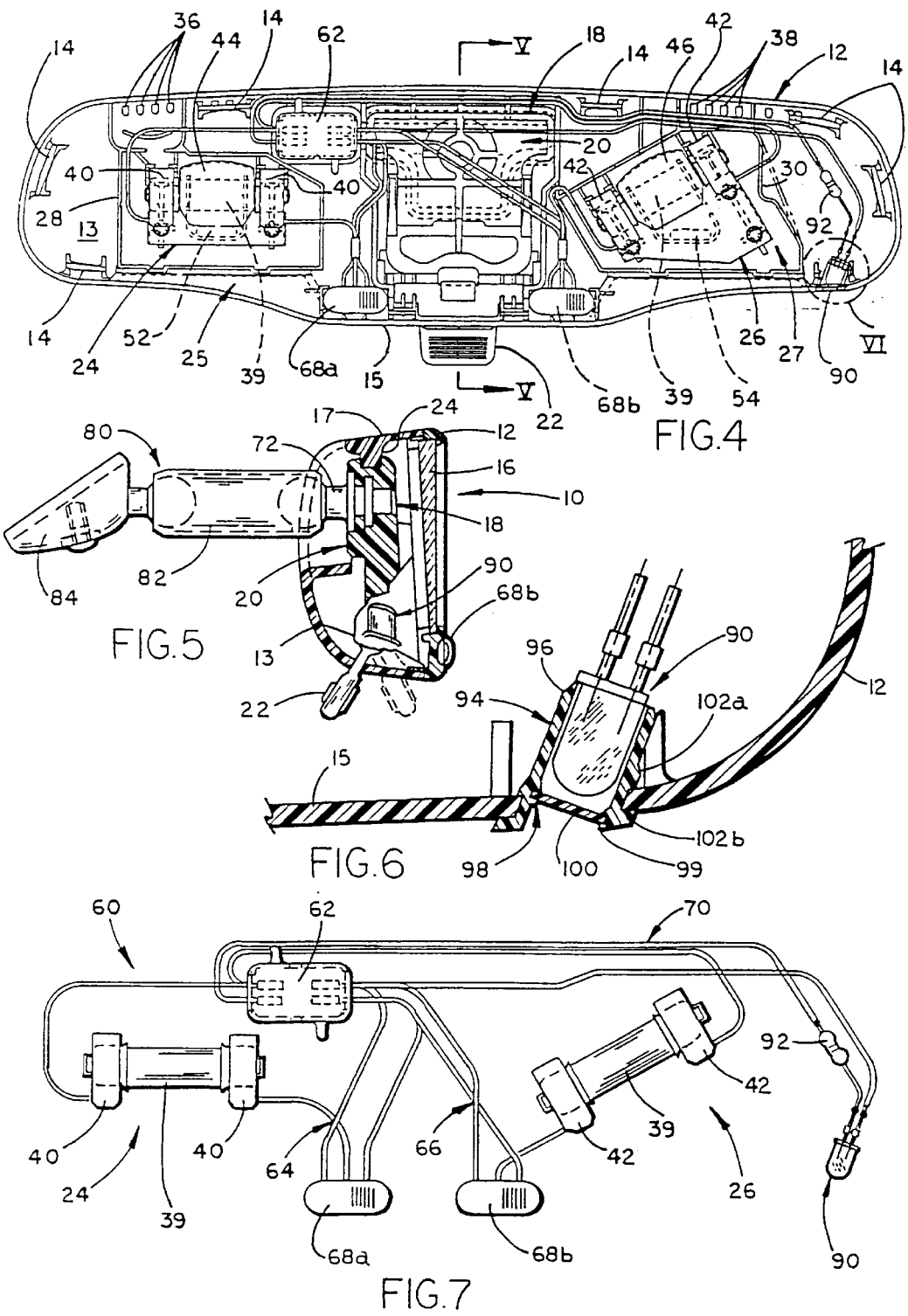

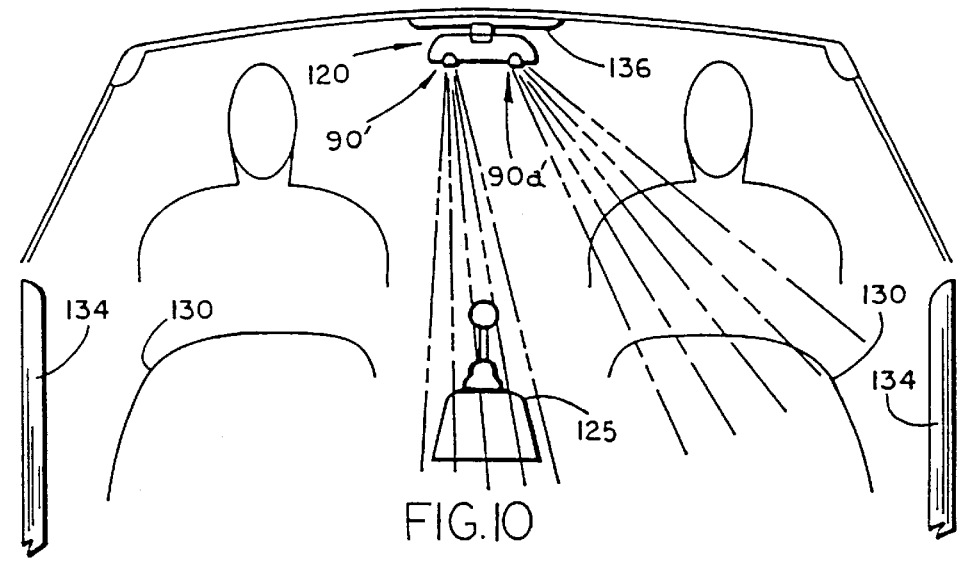
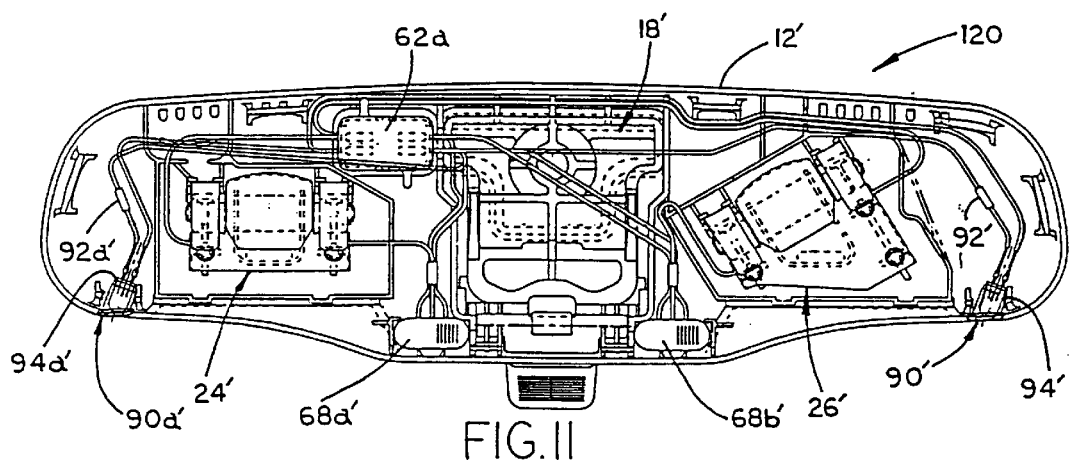
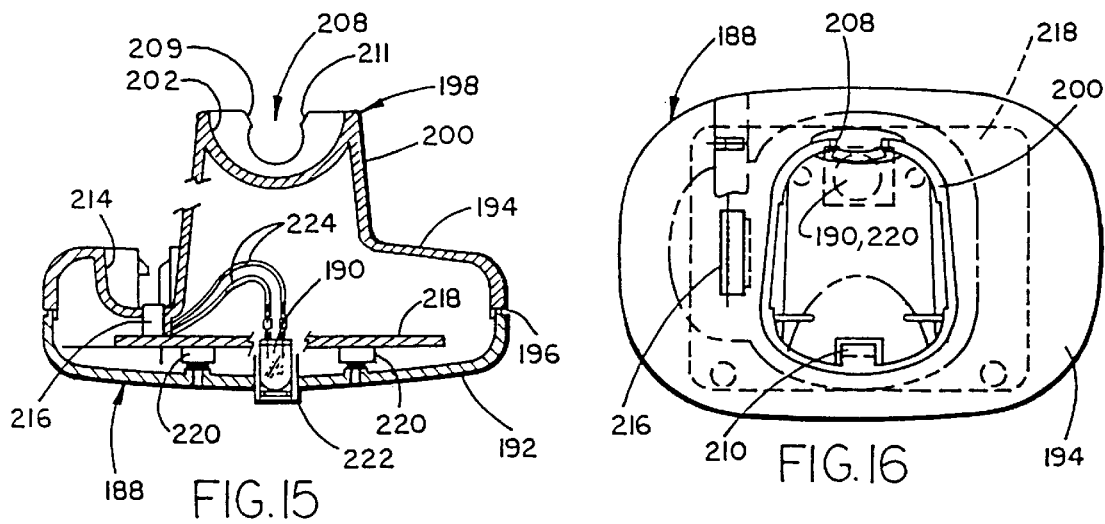

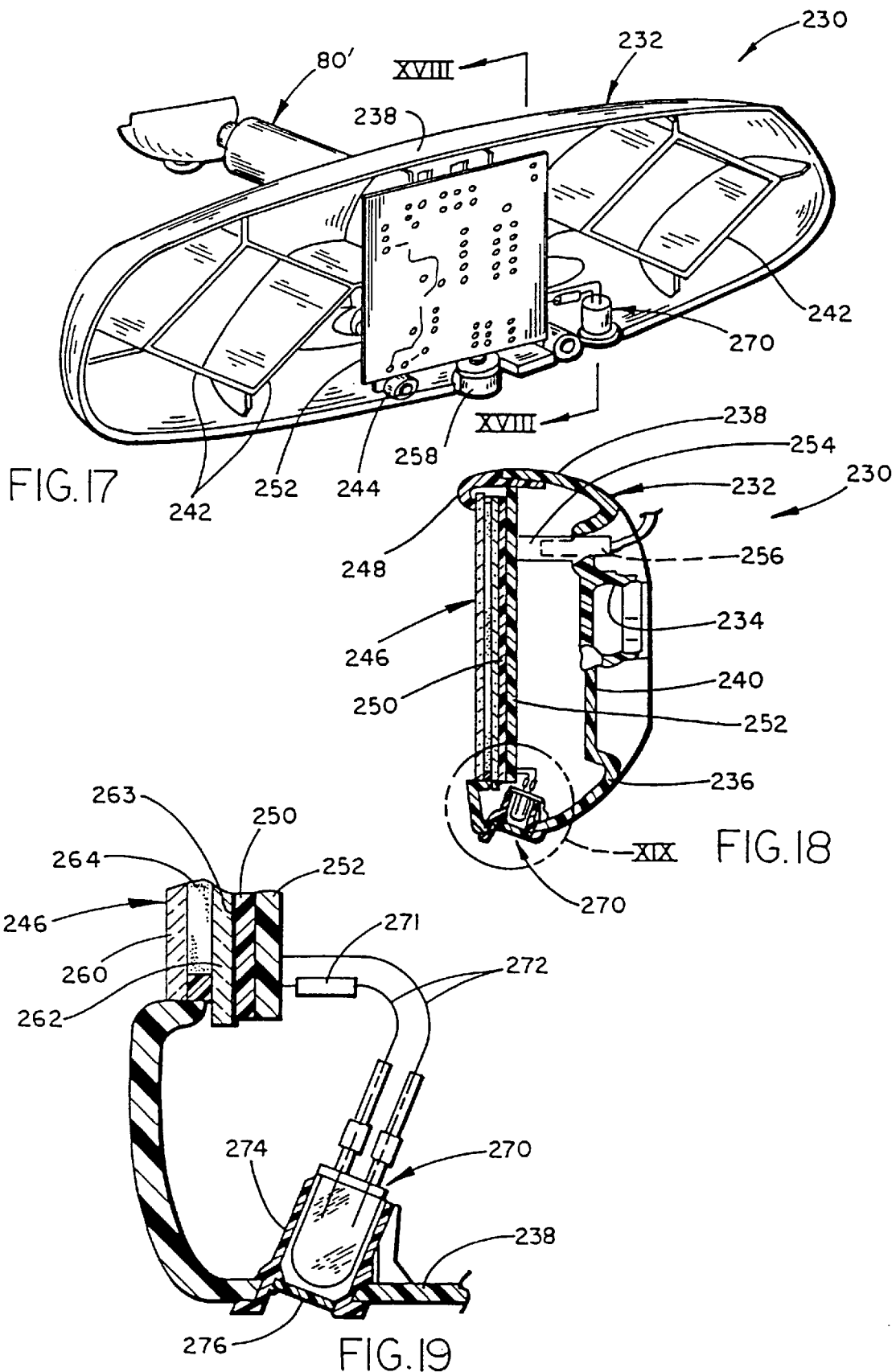

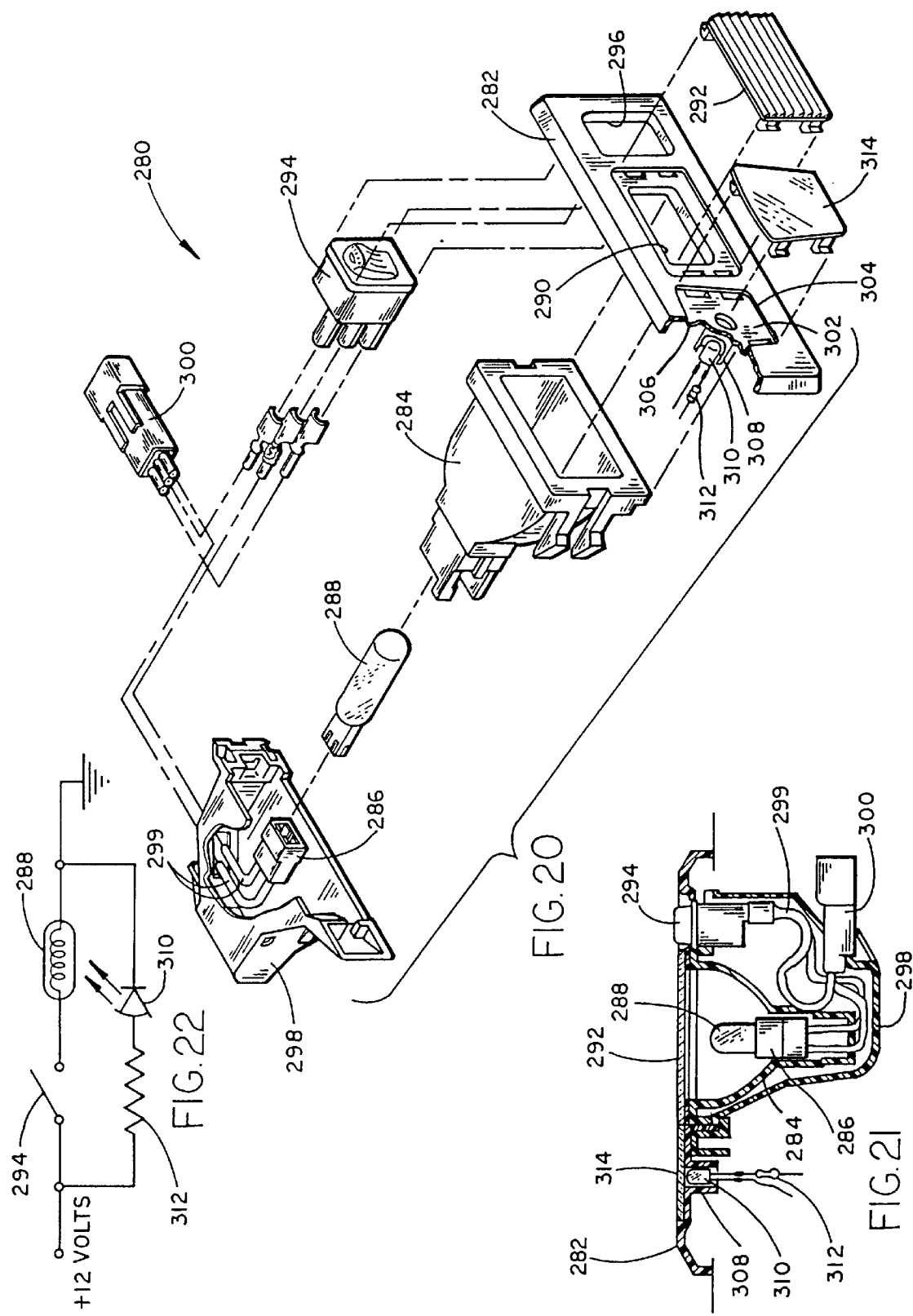

INTERIOR MIRROR ASSEMBLY FOR A VEHICLE INCORPORATING A SOLID-STATE LIGHT SOURCE

CROSS REFERENCE TO RELATED APPLICATIONS

This is a continuation of application Ser. No. 08/937,480, filed Sep. 25, 1997, now U.S. Pat. No. 5,938,321, by Brent J. Bos, Stephen J. Forbes and Roger L. Veldman, entitled VEHICLE INSTRUMENTATION/CONSOLE LIGHTING, the disclosure of which is hereby incorporated by reference herein, which is a continuation of application Ser. No. 08/367,844, filed Dec. 30, 1994, now U.S. Pat. No. 5,671,996, the disclosure of which is hereby incorporated by reference herein.

FIELD OF THE INVENTION

This invention relates to interior vehicle instrumentation and/or console lighting and, more particularly, to interior rearview mirror assemblies and interior lamp assemblies for vehicles which incorporate a low level light emitting source for non-glare producing illumination of instrumentation or controls within a vehicle, especially in the instrument panel or control console areas at the front of the vehicle passenger compartment.

BACKGROUND OF THE INVENTION

Conventional lighting within vehicles includes general interior lighting for reading, entry of passengers at night and the like, as well as localized lighting for instrumentation and control switches. The former is typically provided by one or more lighting assemblies in the roof, header area, door panels or quarter window areas of the vehicle, while the latter is usually provided by means of individual light emitting sources at the rear of an instrument cluster or switch to provide back lighting visible from the front of the instrument or control. However, these conventional lighting sources fail to provide illumination of many other controls needed to fully operate the vehicle, leaving the driver or passenger to grope clumsily at night or in low light conditions to find items such as an ashtray, door handle, seat or window switch, heater control, cup holder or the like. Alternately, the person may switch on a general overhead light to find a particular control or handle but creating high levels of unwanted glare causing unsafe driving conditions for the vehicle driver. Use of such a conventional overhead or other general illumination light emitting source has typically included an incandescent bulb requiring high power levels and creating additional heat within the vehicle. Such incandescent light bulbs are also subject to short life spans and frequent failure. Consequently, incandescent light bulbs are usually a service item in the vehicle normally requiring service instruction to the dealership and/or consumer and spare part inventory by the vehicle manufacturer. Moreover, use of such conventional lighting cannot be continuous during night vehicle use because of the high glare levels produced, thereby leaving many controls within the vehicle identified for most night driving or other low level light conditions.

Accordingly, the need was recognized for improved illumination of instrumentation, controls, and/or other areas within a vehicle which would avoid production of unwanted, unsafe glare yet identify necessary vehicle controls without typical backlit instrumentation and electrical control switches.

SUMMARY OF THE INVENTION

In recognition of the above, the present invention provides a centralized low level illumination source for use within the interior of a vehicle which obviates the need for local light emitting sources, such as those conventionally used to provide backlit illumination of control panel and control fascia instrumentation and controls, while also illuminating vehicle controls which were normally unlit and unidentified such as center consoles, shift levers, cup holders, parking brake levers, interior door handles, storage receptacles, sunroof controls, and the like. More specifically, the invention provides a non-incandescent, directed, low level, light emitting source in an interior rearview mirror assembly or interior vehicle lamp assembly which provides local area illumination taking advantage of the central, high-mounted, geographical location of the interior mirror assembly or other location of a lamp assembly within the vehicle.

In one form, the invention is an interior rearview mirror assembly for vehicles comprising a mirror case, a reflective mirror element within the case, a support for securing the assembly on a vehicle, a non-incandescent, directed, low level light emitting source, and a mount receiving the light emitting source, the light emitting source being positioned to provide directed, low level illumination of an interior portion of the vehicle. Preferably, the mount is on or within at least one of the mirror case and support. The light emitting source may optionally be mounted on either the mirror case or on the mirror support such as the mirror mounting arm. When on the mounting arm, the light emitting source may be positioned at the header area of the arm where it connects to the vehicle roof, or by separately mounted such as in an instrument housing/pod suspended from the mounting arm. The mirror case may also include at least one lamp, typically incandescent, providing general illumination within the vehicle for reading, courtesy lighting during passenger entry, or the like, which lamp may be separately switched from the low level light emitting source.

The low level light emitting source avoids causing glare visible by the vehicle driver, and preferably provides illumination of less than about 60 lux, preferably less than about 25 lux, and most preferably less than about 10 lux at the locations desired to be illuminated. Preferably, the light emitting source is a solid state source such as a light emitting diode although vacuum fluorescent sources, electroluminescent sources (including both organic electroluminescent sources and inorganic electroluminescent sources), and semiconductor laser sources may also be used. The preferred light emitting diode is preferably mounted in a hollow mounting adaptor telescopingly receiving the diode in one end and optionally being closed by a lens at the other end. The adaptor is preferably mounted in the bottom wall of the mirror case to the rear of the reflective rear element or in a wall of an interior vehicle lamp assembly in a manner that avoids creation of unwanted glare. If desired, two or more of such low level light emitting sources may be incorporated in the mirror assembly at spaced locations for directing light at a desired or different portions of the vehicle interior, or may be grouped to provide more intense and/or broader area local illumination.

In the most preferred form, the light emitting diode low level light emitting source provides a maximum illumination of about 0.2 to 4.0 lux at about 22 to 26 inches at about 20 mA to about 50 mA current, or less, and about 2.0 volts to about 5.0 volts, or less. The diode is typically connected in series with a suitable electrical resistor (typically less than about 1500 ohms and greater than about 100 ohms in electrical resistance; more preferably, less than about 1000 ohms and greater than about 200 ohms in resistance) to reduce the current to the diode, and preferably, to enable connection to an ignition voltage of the vehicle (typically 9 to 16 volts with about 12 volts nominal) and may be controlled by the ignition switch of the vehicle power system and/or by a rheostat/dimmer switch located, for example, at the headlight control switch for the vehicle.

The interior rearview mirror assembly or interior vehicle lamp assembly incorporating the low level light emitting source of the present invention provides numerous advantages over prior known vehicles instrumentation or control illumination sources. The present light emitting source may be directed to specific areas of instrumentation or control switches and provides illumination of controls previously unlit such as shift levers, parking brake levers, ashtrays, cupholders, HVAC controls, radio knobs and the like. The light emitting source is small and compact in size and highly durable having a life span typically longer than the operational lifetime of the vehicle itself, and may be mounted in confined locations without concern for access for repair or replacement. The light emitting source preferably provides a defined pattern of light such as a cone of light which may be directed as desired without any separate reflector, separate lens, separate collimator, etc.; has low power consumption requirements and thus, desirably and optionally, may be illuminated whenever the ignition switch of the vehicle is at the accessory on position or at the ignition on position, day and night; creates virtually no heat within the vehicle; and is amenable to mounting in many areas for illumination of desired controls. Moreover, the light emitting source avoids the creation of unwanted, unsafe glare which could otherwise distract or temporarily disable a vehicle driver. The light emitting source may also be used separately or together with other low level light emitting sources, can be used with virtually any mirror assembly or interior lamp assembly and can be adjusted if mounted on or without the mirror case, or fixed in position on or within the mirror support such as on or without the mirror mounting arm or the coupling channel member, a separate instrument pod, or an interior lamp assembly. The light emitting source can also be provide a variety of pleasing illumination colors without the need for separate coloring filters.

These and other objects, advantages, purposes and features of the invention will become more apparent from a study of the following description taken in conjunction with the drawings.

BRIEF DESCRIPTION OF THE DRAWINGS

FIG. 4 is a front elevation of the interior of the rearview mirror assembly of FIGS. 1 and 3 taken along plane IV—IV of FIG. 3 and illustrating the mounting of the low level light emitting source;

FIG. 5 is a sectional side elevation of the interior rear view mirror assembly taken along plane V—V of FIG. 4;

FIG. 6 is an enlarged, sectional elevation of area VI of FIG. 4 illustrating the mounting of the light emitting diode forming the low level light emitting source;

FIG. 7 is an illustration of the wire harness providing the electrical circuit for the low level light emitting source and separate courtesy/reading map lights incorporated in the rearview mirror assembly of FIGS. 1 and 3–5;

FIG. 10 is a schematic illustration of a second embodiment of the interior rearview mirror assembly of the present invention incorporating a pair of low level light emitting sources illuminating different areas of the vehicle interior;

FIG. 11 is a front elevation of the interior of the rearview mirror assembly similar to FIG. 4 but incorporating two low level light emitting sources;

FIG. 15 is a sectional view of the instrument housing/pod incorporating the low level light emitting source taken along plane XV—XV of FIG. 14;

FIG. 16 is a plan view of the instrument housing/pod of FIGS. 14 and 15;

FIG. 17 is a perspective view of an alternate interior rearview mirror assembly incorporating a low level light emitting source, the reflective mirror element and retaining bezel being removed for viewing the internal construction of the assembly;

FIG. 18 is a sectional, side elevation of the interior rearview mirror assembly of FIG. 17;

FIG. 19 is an enlarged, sectional view of area XIX of FIG. 18 of the low level light emitting source mounted in the interior rearview mirror assembly;

FIG. 20 is an exploded, perspective view of an interior vehicle lamp assembly incorporating a low level light emitting source of the present invention;

FIG. 21 is a sectional, bottom plan view of the interior vehicle lamp assembly shown in FIG. 20; and FIG. 22 is a diagram of the electrical circuit for the interior vehicle lamp assembly of FIGS. 20 and 21.

DESCRIPTION OF THE PREFERRED EMBODIMENTS

Figure 12:
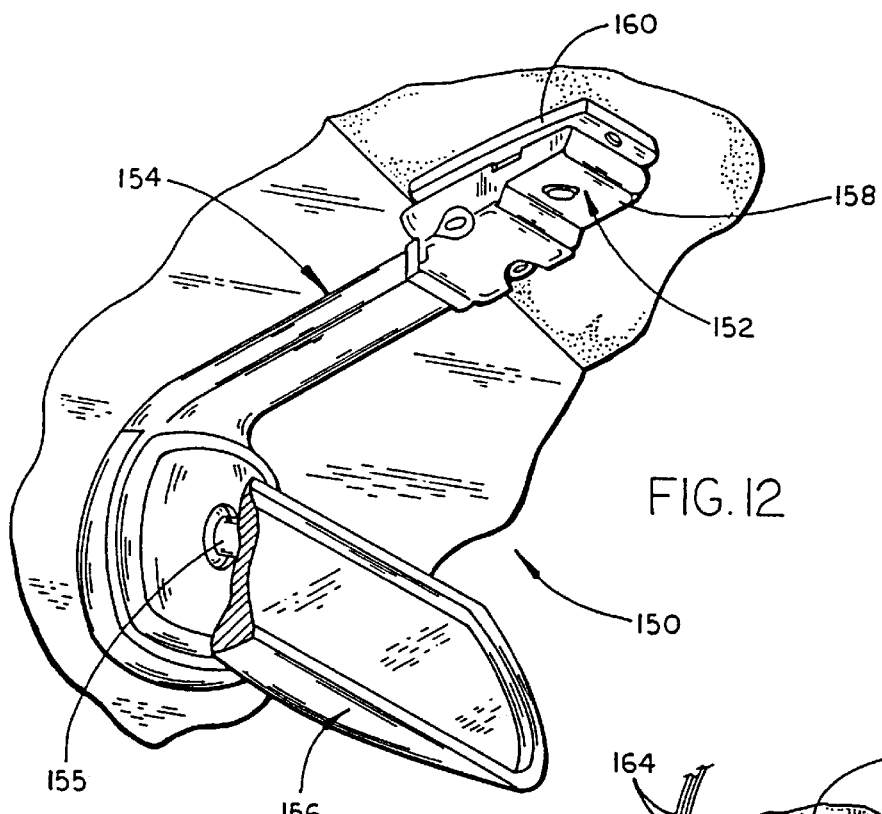
FIG. 12 is a partially broken perspective view of a third embodiment of the interior rearview mirror assembly of the present invention incorporating a low level light emitting source in the header mounting bracket of the rearview mirror mounting arm of the assembly.
Figure 13:
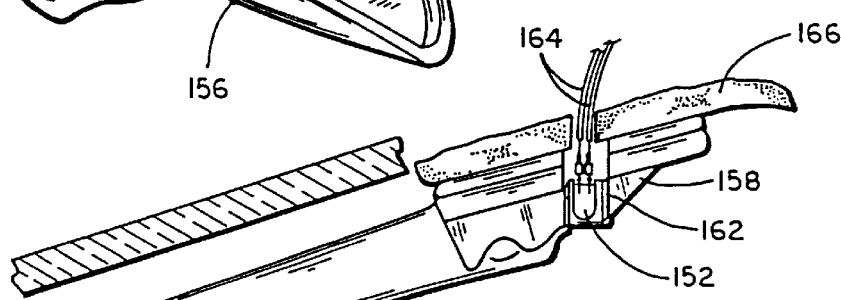
FIG. 13 is a side elevation of the rearview mirror assembly of FIG. 12 with portions broken away illustrating the mounting of the low level light emitting source in the header mounting bracket.
Figure 14:
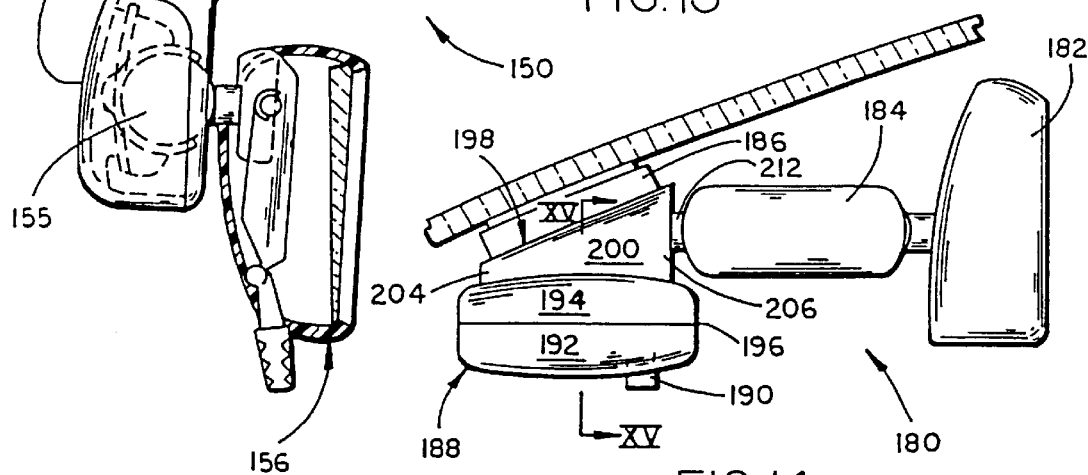
FIG. 14 is a side elevation of a fourth embodiment of the interior rearview mirror assembly incorporating a low level light emitting source of the present invention with the light emitting source mounted in a separate instrument housing/pod attached to the mirror support.

Referring now to the drawings in greater detail, FIGS. 1–7 illustrate a first embodiment 10 of an interior rearview mirror assembly of the present invention which incorporates a low level light emitting source adapted for centralized illumination of portions of a vehicle interior such as the instrumentation or controls in the instrument panel and/or console areas of a vehicle. Such console areas include floor consoles 121 (FIG. 2), shift lever consoles 125 (FIGS. 2 and 10), instrument panel consoles 130 (FIG. 10), side door consoles 134 (FIG. 10), and, for light emitting sources mounted to direct light upwardly to the roof areas of the vehicle, header consoles 136 (FIG. 10) located such as in the headliner area and roof area such as above the front vehicle seats. The shift lever console 125 includes the gear shift or transmission selector lever including the PRND21 transmission selector indicator panel and, optionally, small part/coin storage bins, cup holders, ashtrays, control switches, etc. Such shift lever consoles are typically located in the floor centerline of the vehicle. However, on some vehicles, they may be mounted elsewhere such as on or about the steering column or off the instrument panel/front facia. Rearview mirror assembly 10 includes a support 80 for securing the mirror assembly to the vehicle on a windshield mounted member as shown in FIGS. 5 and 14, or a mirror support arm 154 having a breakaway header bracket 158 secured to the roof area of the vehicle above the windshield as shown in FIGS. 12 and 13. As will be more fully explained hereinafter, rearview mirror assembly 10 includes a directed, low level, non-incandescent light emitting source 90, preferably positioned on or within the mirror case and on or within the mirror support. In addition to low level light emitting source 90, mirror case 12 may also optionally include one or more lamp assemblies 24, 26 which provide separately switched, general illumination of the vehicle interior for reading, passenger entry, or the like. As explained below, low level light emitting source 90 is controlled separately from the lamp assemblies 24, 26 by the vehicle ignition switch and/or by a rheostat/dimmer switch such as that typically incorporated with the headlight control switch for the vehicle.

Mirror assembly 10 includes at typically hollow mirror case 12 molded from resinous plastic material, preferably a fiber reinforced nylon plastic or an ABS plastic, or polypropylene, or other similar thermoplastic or thermoset material, and includes a similarly molded peripheral rim or bezel 12a also preferably formed from reinforced nylon or ABS plastic or polypropylene including spaced projections (not shown) snap-fitted into clips 14 integrally molded adjacent the periphery within case 12 (FIG. 4). Bezel 12a holds a prismatic, reflective rearview mirror element 16, preferably formed from transparent glass or resinous plastic material and having a reflective coating on its rear surface, fixed within the case. Mirror case 12 is preferably of the type described in common assigned, U.S. Pat. No. 5,178,448, the disclosure of which is hereby incorporated by reference herein, and includes an overcenter pivot type day/night actuator assembly 18 including a toggle member 20 preferably molded from reinforced nylon and a pivot lever 22 preferably molded from acetal end of the type disclosed in commonly assigned, U.S. Pat. No. 5,327,288, the disclosure of which is hereby incorporated by reference herein. Movement of pivot lever 22 between the two positions shown in FIG. 5 rotates mirror case 12 including bezel 12a and reflective mirror element 16 about pivot axle 24 thereby changing the position of the prismatic mirror element from a high reflectivity day position in which incident light is reflected to the user's eyes from the highly reflective rear surface of the element 16 to a reduced reflectivity, partial reflectance, night position in which a reduced amount of light incident on the mirror element is reflected from the front surface of mirror element 16.

In addition, mirror case 12 includes a pair of lamp assemblies 24, 26 positioned on either side or actuator assembly 18 within compartments 25, 27 defined by walls 28, 30 molded on the interior of the back wall 13 of mirror case 12. The bottom portion 15 of the periphery of mirror case 12 includes a pair of light openings 32, 34, each light opening communicating with the respective compartment 25, 27 through which light from lamp assemblies 24–26 passes out of the mirror assembly. Lamp compartments 25, 27 also communicate respectively with a series of openings 36 and a series of openings 38 (FIG. 4) near the top wall 17 of the periphery of mirror case 12 thereby providing a ventilation path. from opening 32 or 34 past each lamp assembly through each compartment. Lamp assemblies 24, 26 preferably include cartridge style, incandescent light bulbs 39 (FIGS. 4 and 7) having a metallic connector at each end and preferably a four candle power rating received in bayonet style lamp holders 40, 42 positioned at spaced locations within the respective compartments 25, 27. In addition, generally U-shaped bent metallic reflectors 44, 46, preferably formed from bright-dipped, anodized aluminum alloy, are mounted in the respective compartments to extend around the length of light bulbs 39 and reflect light from those bulbs through openings 32, 34, respectively. Lamp assembly 24 is positioned to direct light through opening 32 generally downwardly while assembly 26 directs light downwardly and to the right from the position shown in FIG. 4. Lenses 48, 50, preferably formed from polycarbonate, are mounted in recessed openings 32, 34 to help direct light from lamp assemblies 24, 26 into the lap areas of the driver and passenger within the vehicle, respectively. Each lens defines a peripheral opening with the edge of its respective opening 32, 34 extending therearound to provide an entrance to the ventilation passageway allowing air to pass into compartments 25, 27. In addition, rear ventilation openings such as those shown at 52, 54 may be provided through rear wall 13 of mirror case 12 to provide additional ventilation of the compartments.

As shown in FIGS. 4 and 7, lamp assemblies 24, 26 including bulbs 39 are connected to a source of electrical power in the vehicle electrical system by means of a wiring harness 60 including a connection block 62 mounted within mirror case 12 from which power from the vehicle electrical system is routed to the respective lamp assemblies 24, 26 by electrical wiring forming separate electrical circuits 64, 66. Connector block 62 is connected to the vehicle electrical system by a plug (not shown) received through an opening in back wall 13 of the mirror case. Each circuit includes a single pole, double-throw switch 68a, 68b for individual actuation of bulb 39 in lamp assembly 24 or 26 as desired. As explained more fully below, connection block 62 also provides a source of electrical power for a third electrical circuit 70 connected to the low power light emitting source 90.

As is best seen in FIG. 5, actuator assembly 18 includes a ball member 72 preferably formed from metal such as die-cast zinc, insert molded within toggle member 20 and projecting rearwardly through an opening in the back wall 13 of mirror case 12. Ball member 72 is connected to mirror support 80 including a pivotal, double ball joint mounting arm 82 which, in turn, is connected to a preferably die-cast zinc coupling channel member 84 adapted for attachment to a windshield mounted securing member as is conventionally known in the art. Channel member 84 is fixed with respect to the windshield wherein mirror case 12 and mounting arm 82 are moveable. Other forms of mirror supports may also be used such as single pivot mounting arms attached to the vehicle in the header roof area above the windshield as shown in FIGS. 12 and 13 hereinafter, as well as other supports.

As is also shown in FIGS. 1 and 3–7, the low level, directed, light emitting source 90 of the present invention is mounted in interior rearview mirror assembly 10 so as to direct low level light through the bottom wall 15 of the mirror case. A variety of emitting sources may be used as light emitting source 90, including, but not limited to, very high intensity amber and reddish-orange light emitting diode (LED) sources, such as solid state light emitting diode LED sources utilizing double heterojunction AlGaAs/GaAs material technology, such as very high intensity red LED lamps T-1 3/4 (5 mm) HLMP-4100/4101, available from Hewlett Packard Corporation, Palo Alto, Calif., or which use transparent substrate aluminum indium gallium phosphide (AlInGaP) material technology, commercially available from Hewlett Packard Corporation, Palo Alto, Calif. under designation T-1 3/4 (5 mm) HLMT-DL00, HLMT-CH00, HLMT-CL00, HLMT-CH15, HLMT-CL15 and HLMT-DH00, or which use InGaAlP material technology available from Toshiba Corporation of Latham, N.Y., such as under the designation TLRH180D. Light emittance colors provided by such solid-state sources include orange, yellow, amber, red and reddish-orange, desirably without need of ancillary spectral filters. The preferred solid-state light emitting diodes, at 25° C. or thereabouts, operate at a forward voltage of about 2 volts to about 5 volts; have a luminous intensity (measured at the peak of the spacial radiation pattern which may not be aligned with the mechanical axis of the source package) of a minimum, at 20 mA current, of about 500 to about 5000 mcd (typical, about 700 to about 7000 mcd); operate at a forward current of about 20 mA to about 50 mA; emit with a dominant wavelength (CIE Chromaticity Diagram) of about 530 nm to about 680 nm; and have a viewing angle $2\theta_{1/2}$ (where $\theta_{1/2}$ is the off-axis angle where the luminous intensity is one half the peak intensity) of about 5 degrees to about 25 degrees.

Alternatively, vacuum fluorescent sources, such as 12V battery driven, high luminance, vacuum fluorescent sources may be advantageously used. It may also be advantageous to use sources 90 which operate efficiently at about 12V or lower since these voltages are particularly amenable to motor vehicles. Also, ultrahigh luminance vacuum fluorescent sources, such as those suitable for heads-up-display applications in motor vehicles may be used with appropriate circuitry. Light emitting source 90 preferably produces a light level which, when measured at about 22 to 26 inches, is desirably less than about 60 lux, preferably less than about 25 lux, and most preferably less than about 10 lux, and has a low power consumption requiring a current less than about 200 mA, and preferably less than about 100 mA, and most preferably less than about 50 mA. Alternately, non-LED, non-incandescent light emitting sources can be utilized such as electroluminescent sources, or semiconductor laser sources. The electroluminescent sources may be either inorganic or organic electroluminescent sources. Light emitting source 90 preferably has a well-defined light pattern, such as a cone of directed, low level light which eliminates the need for reflectors or other separate optical components to direct the light where desired, is preferably mounted on or within the mirror case 12, the mounting arm 82 or the channel member 84, and positioned to direct light at the desired area of the vehicle interior, e.g., the instrument panel or console area, and generates low heat while having an extremely long and durable life which typically will outlast the operational life of the rearview mirror assembly and the vehicle on which it is mounted. If mounted on or within channel member 84, light emitting source 90 may be fixed to illuminate a predetermined location within the interior cabin. The small size of light emitting source 90, which preferably has a cross-sectional area less than about 4 cm$^2$, and more preferably less than about 1 cm$^2$, allows it to be easily positioned within the confined spaces of the rearview mirror assembly or interior lamp assembly. Because of their durability, these sources require little or no maintenance or repair thereby eliminating concern for access after mirror assembly 10 or an interior lamp assembly is manufactured. The preferred HLMT-DL00 diode from Hewlett Packard is available with a generally circular area of about 0.3 cm$^2$ and requires only 20 mA current for operation and provides a 23° cone of directed light with a dominant amber color of a typical dominant wavelength of approximately 590 nm, and a typical intensity of 1500 millicandela (mcd). Preferably, a resistor of about 450 ohms to about 500 ohms, typically about 470 ohms, is connected in series with the preferred LED, with the ignition/battery voltage of the vehicle being directly applied across their series connection. Other colors such as green, orange, yellow, red and blue may also be obtained depending on the elemental composition of the diode or other light emitting source selected. Separate filters are not required to produce the colors. The low level illumination provided by the light emitting diode 90 preferably has a maximum of about 0.2 to 4.0 lux at a distance of between about 22 and 26 inches at current of about 20 mA to about 50 mA at about 2.0 volts to about 5.0 volts. A resistor 92 is preferably connected in series with the light emitting diode to act as a voltage divider so as to reduce the ignition voltage of the vehicle, which is in the range of 9 to 16 volts (nominally 12 volts), to the desired operating voltage of the light source 90 (while typically is in the range of about 1 to about 5 volts, with about 2 volts to about 4.5 volts most typical for the preferred solid-state, very high intensity LED sources). Resistor 92 preferably has a resistance of less than about 1500 ohms and greater than about 100 ohms; more preferably less than about 1000 ohms and greater than about 200 ohms.

As is best seen in FIG. 6, it is preferred that the light emitting source such as source 90 (such as an LED) be mounted within one end of a hollow, molded plastic, cylindrical adaptor 94 having one open end 96 within the mirror case through which the source is telescopically fitted and retained by friction or otherwise and a second opening 98 through the bottom wall of mirror case 12. Opening 98 may optionally be closed by a clear plastic lens 100 which is snap-fitted between mounting ribs 99. Lens 100 may be any of a Fresnel lens, or a binary optic, or a refractive optic, or a holographic optic. Opening 98 helps confine and direct the pattern of light emanating from light source 90. Light source 90 may be mounted in a light conduit which may be formed separate from, or integral with (such as by molding during the molding of the case, or bezel of the case itself), the mirror case, mounting arm or channel member. The inner walls of this light conduit may optionally be coated with a diffuse and/or specularly reflecting material to provide a surface that enhances efficient illumination of interior vehicular locations. Also light directing means such as fiberoptic cables or bundles may optionally be used in conjunction with light source 90. In addition, the exterior surface of the lower end of adapter 94 includes spaced ridges 102a, 102b which receive the thickness of bottom wall 15 of mirror case 12 therebetween to stably support and position the adapter in the mirror case. The upper ridge 102a may include a tapered surface as does the upper end of adaptor 94 allowing the adapter to be pushed and snap-fitted into a circular opening in the bottom wall of the mirror case as shown in FIG. 6. Preferably, hollow adapter 94 is molded from any thermoplastic resinous plastic although thermoset, resinous plastics could also be used. Also, adapter 94 may be formed during the molding of the mirror case 12 itself and/or during molding of a subassembly of the mirror case, such as a bezel. Such molding may include insert injection molding whereby a diffuse and/or specularly reflecting surface or sleeve may be created across and along the inwardly facing surface of the inner walls of adapter 94.

Figure 8:
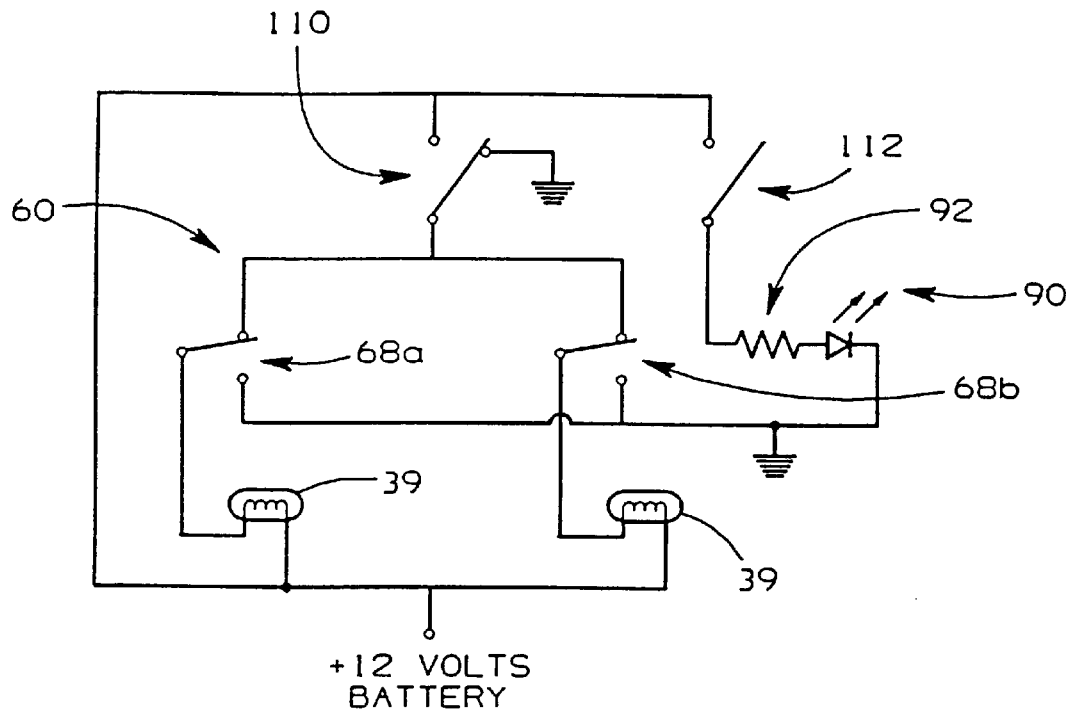
FIG. 8 is a diagram of the electrical circuit for a vehicle incorporating the interior rearview mirror assembly of the FIGS. 1 and 3–5 illustrating control of the low level light emitting source via the vehicle ignition switch.

As shown in FIG. 7, when connected via circuit 70 to connector block 62 and the power system of the vehicle in which the mirror assembly 10 is mounted, light emitting source such as diode 90 provides a directed pattern of light of low level intensity for illuminating the desired area of the vehicle such as the center console including the transmission shift lever (FIG. 2) without creating glare visible by the driver of the vehicle in which the assembly is mounted. The diode provides continuous illumination of the desired areas without requiring backlit, individual lighting on the instrumentation or controls, without generating significant heat, and without producing unwanted glare. As shown in FIG. 8, light emitting diode 90 and resistor 92 may be connected in series in circuit 60 to the power system of the vehicle which includes a door operated switch 110 for alternate operation of lamp assemblies 24, 26 with manual switches 68a, 68b, and an ignition switch 112 which controls actuation of the diode. The vehicle power system is typically connected to a 12-volt DC battery, as illustrated. Thus, in this circuit, if the door of the vehicle is opened as shown in FIG. 8, power will be directed to the general illumination lamps 39 forming parts of lamp assemblies 24, 26 described above. In the event switches 68a, 68b are moved to their alternate positions, lamps 39 will be lighted regardless of whether the vehicle door is opened or closed. Light emitting diode 90 is operated by the closing of ignition switch 112 to either its accessory on or ignition on position and provides constant illumination of the desired instrument panel and/or console area of the vehicle interior at all times when the ignition switch is turned to the ignition on position or to the accessory on position.

Figure 9:
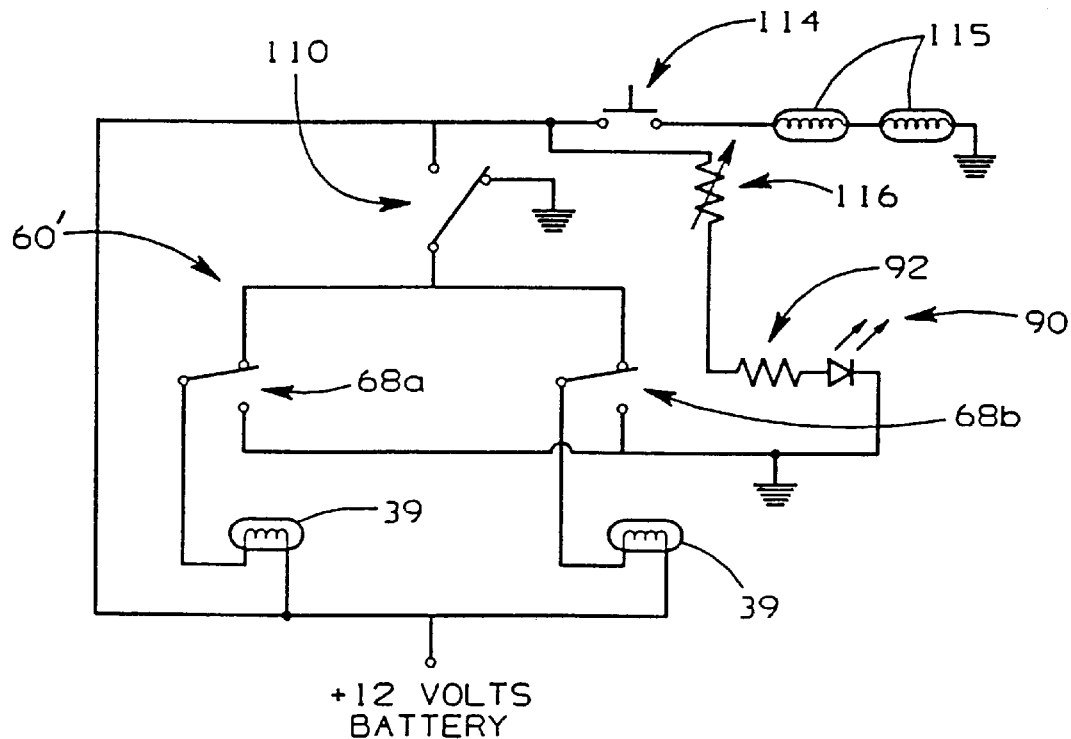
FIG. 9 is a diagram of a vehicle electrical system incorporating the interior rearview mirror assembly of FIGS. 1 and 3–5 illustrating control of the low level light emitting source by a rheostat in the headlight control switch.

Alternately, light emitting diode 90 and resistor 92 may be connected in series to the power system of the vehicle through a rheostat/dimmer switch 116 located, for example, at the headlight control switch 114. In this version, 60' (FIG. 9) general illumination lamps 39 are controlled in the same manner as described above by door switch 110 or the manual control switches 68a, 68b. Light emitting diode 90 is controlled by rheostat/dimmer switch 116. The intensity of the light provided by diode 90 may be changed by rheostat/dimmer switch 116. Headlights 115 are separately controlled with switch 114 typically mounted in conjunction with rheostat 116. Accordingly, the low level illumination provided by light emitting diode 90 may be variously controlled to operate at all times during vehicle operation or as desired through a separate rheostat control switch.

As shown in FIGS. 10 and 11, a second embodiment 120 of the interior rearview mirror assembly of the present invention may incorporate a pair of low level light emitting sources such as light emitting diodes 90', 90a' of the type described above in connection with assembly 10. Assembly 120 includes a mirror case 12', actuator assembly 18', lamp assemblies 24', 26' operated by switches 68a', 68b' all substantially similar to those described above in connection with assembly 10. Instead of a single light emitting source 90, however, assembly 120 includes two light emitting diodes 90', 90a' positioned at opposite ends of the mirror case as shown in FIG. 11. Each light emitting diode 90', 90a' telescopingly mounted in a hollow, cylindrical adapter 94', 94a' as described above in connection with assembly 10 and as shown in FIG. 6. Diode 90', when mounted in its adapter 94', is directed to provide low level illumination of, for example, the center or shift lever console 125 and instrument panel areas of the vehicle while diode 90a' when mounted in its adapter 94a' is directed more sharply toward the instrument panel area 130 in front of the vehicle driver. In some vehicles, a floor console is located at the position of the shift lever console, and the diode 90' will illuminate that console. Also, various controls may be located in a console area on the side door such as at 134 in FIG. 10 and diode 90a' may be directed from mirror assembly 120 to illuminate such areas as well. Alternately, one or more of the diodes could be mounted in case 120 and directed upwardly against a roof mounted header or headliner console as shown at 136 in FIG. 10. The positions of the light as directed by the diodes can, of course, be adjusted by moving the mirror assembly on its support. Each diode also includes an electrical resistor 92', 92a' connected in series therewith as described above in connection with assembly 10. Alternately, diodes 90' and 90a' can both be connected in series with a common resistor, the ignition/battery voltage of the vehicle being applied across the series connected of the voltage dividing resistor and the two LED's. The diodes in assembly 120 are connected in parallel from connector block 62a such that both will provide directed low level light as controlled by the ignition switch 112 or rheostat/dimmer switch 116 as described above in connection with FIGS. 8 and 9. Accordingly, multiple low level light emitting sources can be incorporated in the interior rearview mirror assembly for directing low level illumination at desired, different areas of the vehicle interior. Alternately, multiple low level light emitting sources may be directed to illuminate the same target location in the vehicle to enhance intensity, uniformity and/or areal coverage of illumination.

As shown in FIGS. 12 and 13, a third embodiment 150 of the present invention includes a low level light emitting source 152 mounted in the mirror assembly support arm 154 at the header or roof area portion of the vehicle above the windshield. In this version, mirror support arm 154 is fixed in position and provides a single pivot for adjustment of the position of a rearview mirror assembly 156. Mirror assembly 156 may be any of a wide variety of interior rearview mirrors including manually operated, prismatic day/night mirrors as described in U.S. Pat. Nos. 4,826,289 and 4,936,533, electrically operated prismatic day/night mirrors such as described in U.S. Pat. No. 4,948,242, electrically operated, compass mirrors such as described in U.S. Pat. No. 5,253,109, electrically operated, interior rearview mirrors incorporating map/reading lights such as those described in assemblies 10 and 120, or as described in U.S. Pat. Nos. 4,646,210, 4,733,336, 4,807,096 and 5,178,448, as well as electrically operated, automatically dimming mirrors as described in U.S. Pat. Nos. 4,793,690, 4,799,768, 4,886,960 and 5,193,029, preferably electrochromic mirrors utilizing either solid state elements or electrochemichromic elements such as described in commonly-assigned, U.S. patent application Ser. No. 08/316,047, filed Sep. 30, 1994, entitled MODULAR VARIABLE REFLECTANCE MIRROR ASSEMBLY, now U.S. Pat. No. 5,659,423, or electrically operated memory interior rearview mirrors, the disclosures of all of such United States patents and patent applications being incorporated by reference herein. The low light emitting sources of this invention are preferably used in conjunction with electrically operated mirrors as this provides a convenient and economical method to incorporate the sources in the vehicles at a central, high-mounted location, by piggy-back connection to the existing ignition power lines(s) that carry ignition voltage to the electrically operated mirror. Location on or within an interior rearview mirror, and particularly such that the low-level source is emitting downwardly such as through the bottom of the mirror case, is particularly advantageous in its placement of the emitting source below the driver's line of sight so that the driver is largely unaware and unglared by the emitting source mounted on or within the mirror case. Pivot 155 is located at that lower, free end 157 of rigid support arm 154 while the upper end of the arm includes a breakaway assembly 158 adapted to release from a header-mounted plate 160 upon impact during an accident or the like. Breakaway assembly 158 and support arm 154 may take one of several forms such as that shown in co-pending, commonly-assigned, U.S. patent application Ser. No. 08/336,296, filed Nov. 8, 1994, invented by Richard R. Hook, entitled MIRROR SUPPORT BRACKET, now U.S. Pat. No. 5,615,857 or in commonly-assigned U.S. Pat. No. 5,100,095, the disclosures of both of which are also hereby incorporated by reference herein.

As shown in FIG. 13, low level light emitting source 152 if preferably a light emitting diode such as that described above in connection with assembly 10 and is fitted in a hollow, cylindrical adapter 162 similar to that in assembly 10 including circumferential ridges or ribs on the exterior adapted to mate with and fit along the edges of a circular aperture in the wall of the header end 158 of support arm 154. The electrical connections 164 from diode 152 extend through the plate 160 and the headliner/trim panel 166 along the roof of the vehicle for connection to the vehicle power system and ultimate control either by the ignition switch or a rheostat/dimmer switch as explained above in connection with FIGS. 8 and 9. Accordingly, assembly 150 provides a fixed location for the low level light emitting source 152 allowing it to be directed at the desired interior instrument panel/console areas of the vehicle.

With reference to FIGS. 14–16, a fourth embodiment of an interior rearview mirror assembly 180 incorporating a low level light emitting source of the present invention includes an interior rearview mirror 182 of the type shown or described above in connection with embodiments 10, 120 or 150 or others as are conventionally known in the vehicle industry. Mirror assembly 182 is adjustably supported by a double ball pivot assembly 182 such as that shown at 82 above in assembly 10. The double ball pivot arm 184 is connected to a windshield mount by means of a coupler or channel-mount 186 such as that described above at 84 in connection with assembly 10. Instead of mounting the low level light emitting source on the mirror assembly or the mounting arm for the mirror assembly, however, assembly 180 includes a separate instrument housing or pod 188 mounted on coupler 186 and including a low level light emitting source 190 projecting therefrom in a fixed position for illuminating a desired portion of the vehicle interior. Housing/pod 188 is preferably of the type shown and described in co-pending, commonly-assigned U.S. patent application Ser. No. 08/195,353, filed Feb. 10, 1994, entitled VEHICLE INFORMATION DISPLAY invented by Rodney K. Blank et al., now U.S. Pat. No. 5,576,687, the disclosure of which is hereby incorporated by reference herein. Such housing/pod may include displays such as compass, temperature and clock displays; sensors such as compass sensors, GPS sensors, automatic toll sensors, automatic headlamp dimmer sensors, and ambient light sensors; and lights such as incandescent lamps for general illumination within the vehicle.

As shown in FIGS. 14–16, housing or pod 188 includes a two-part housing body including lower body 192 and upper body 194 joined by means of an interengaging rim or joint 196. Upper housing body 194 includes an attachment member 198 including a wall 200 defining a cavity 202 for receiving the coupler 186. Wall 200 has a low profile at one end 204 and increases in height to a taller end 206. Taller end 206 includes a circular recess or clip 208 while the shorter end 204 includes an inwardly projecting tab 210. Recess 208 has a diameter adapted to receive the neck portion 212 extending from a ball member included within mounting arm 186 in snap-fit fashion. Opposed shoulders 209, 211 at the top of the clip 208 form a partial circle with a neck receiving opening slightly smaller than the diameter of neck 212 and allow attachment member 198 to be detachably coupled to the neck. Simultaneously, tab 210 is received in a slot defined in the lower end of the coupler 186 prior to snap-fit of recess 208 around neck 212. Alternately, housing/pod 188 may be secured to coupler 186 by other methods such as threaded fasteners, or the like.

Housing/pod 188 also includes a plug receptacle or recess 214 for receiving an electrical plug to couple electrical energy and/or electrical signals to the instruments mounted within housing/pod 188 by means of a suitable pin connector/electrical plug (not shown). A pin receptacle 216 is mounted in the bottom of recess 214 and is connected to a circuit board 218 mounted on supports 220 within the housing to provide a digital compass or the like for use on the vehicle. In addition to the other instrumentation in housing/pod 188, a low level light emitting source 190 preferably comprising a light emitting diode of the type descried above in connection with assembly 10 is mounted in a fixed position, extends through the wall of lower housing 192 in a hollow, cylindrical adapter 222 as described above in connection with assemblies 10, 120 and 150. Diode 190 is connected by suitable electrical wiring 224 to pin receptacle 216 for connection via an electrical plug to the general vehicle electrical system.

Figure 1:
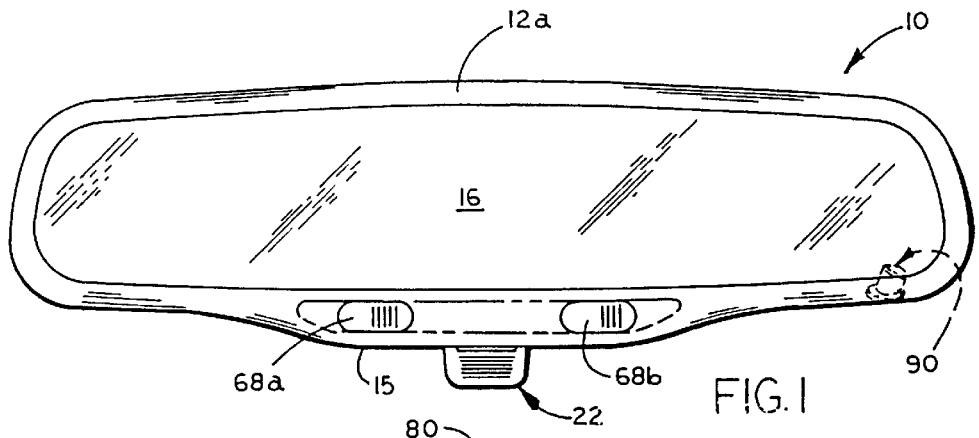
FIG. 1 is a front elevation of an interior rearview mirror assembly incorporating a low level light emitting source of the present invention.
Figure 2:
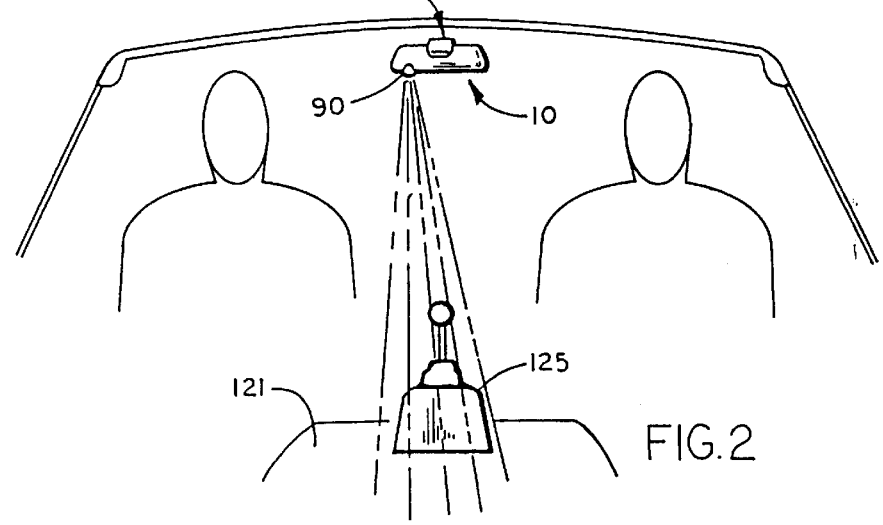
FIG. 2 is a schematic illustration of a vehicle passenger compartment incorporating the rearview mirror assembly with low level light emitting source of FIG. 1 and illustrating illumination of the center console area of the passenger compartment.
Figure 3:
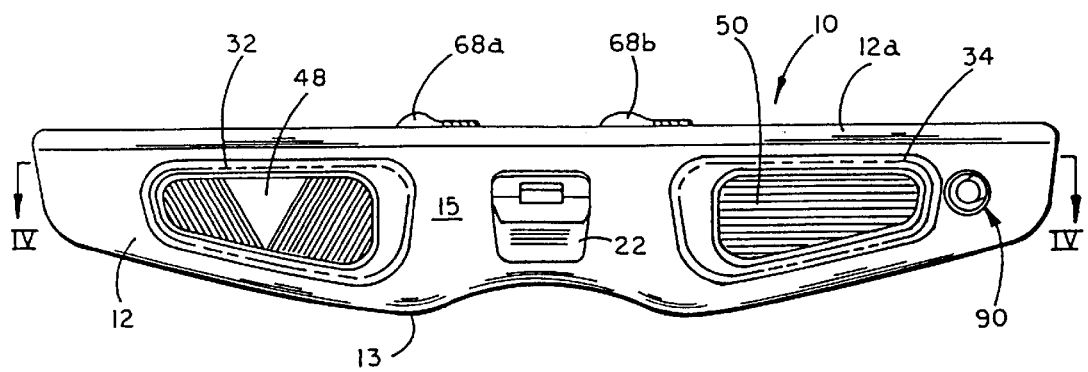
FIG. 3 is a bottom plan view of the rearview mirror assembly with low level light emitting source shown in FIG. 1.

As will now be understood, when diode 190 is suitably mounted in adapter 222 in housing 188 as described above, housing 188 may be secured to coupler 186 forming a part of the rearview mirror assembly support such that light emitting diode 190 is directed downwardly to provide low level illumination of a desired portion of the instrument panel or console area of the vehicle which is generally positioned below the rearview mirror assembly as shown by FIGS. 2, 10 and 14. As above, the operation of diode 190 is preferably controlled either by the ignition switch of the vehicle or by a separate rheostat/dimmer switch such as is shown and descried above in connection with FIGS. 8 and 9. Thus, a low level light emitting source may be positioned in a separate housing secured to the rearview mirror assembly to provide greater flexibility in accommodating various types of rearview mirror assemblies and for different positioning options for illumination of various areas of the vehicle.

Referring now to FIGS. 17–19, a fifth embodiment 230 of an interior rearview mirror assembly incorporating a low level light emitting source of the present invention is shown. Assembly 230 is of the type described in published European Patent Application No. 0 615 882 A2, filed Mar. 18, 1994, the disclosure of which is hereby incorporated by reference herein. The assembly includes a mirror case 232 which, like mirror cases 12 and 12' above; is preferably molded from a resinous, thermoplastic or thermoset plastic which may be reinforced with fibers, adapted for mounting on a vehicle windshield by means of an adjustable mirror support 80' of the type described above in connection with assembly 10. Instead of a ball member extending outwardly from its rear side, mirror case 232 includes a socket 234 for receiving a ball member extending outwardly from mirror support 80', and is a rear wall 236, and a peripheral wall 238 having top, bottom and end portions. Socket 234 is formed in a recess 240 in the rear wall of the case, as shown in FIG. 18. The mirror case also includes a plurality of support flanges 242 integrally formed on the interior surface of the mirror case 232 to support a variable reflectance, electro-optic mirror cell 246 more fully described below. A forward facing light sensor (not shown) extends through rear wall 236 while a second light sensor 244 faces rearwardly. Electro-optic, reflective mirror cell 246 [which preferably is an electrochromic cell either of the solid-state type or the electrochemichromic type] is mounted in the rearwardly facing opening of mirror case 232 and held therein by a peripheral bezel 248 as shown in FIG. 18. A layer of foam material 250 is adhered to the rear surface of mirror cell 246 and covers substantially the entire rear surface of the cell except where items such as through-the-cell photodetectors and information displays, such as compass displays, are mounted behind the mirror. Foam layer 250, such as a cross-linked polyethylene foam, acts as a resilient shock absorber to reduce the risk of breaking the mirror element during an impact, and includes an adhesive layer applied to both its front and rear surfaces. One adhesive surface of the foam is adhered to the rear surface of mirror cell 246. The second adhesive surface provides an attachment for a printed circuit board 252 mounted thereon. The rear surface of circuit board 242 which faces away from mirror cell 246 carries various electrical components of an electrical circuit used to control operation of the electro-optic mirror cell such as a circuit, for example, like that described in commonly-assigned U.S. Pat. No. 4,886,960, the disclosure of which is hereby incorporated by reference herein. Printed circuit board 252 includes a socket 254 on its rear surface for receiving a plug 256 extending from the vehicle electrical system through rear wall 236 at the upper portion of recess 240. Printed circuit board 252 also includes a two-position electrical switch 258 for on/off control of the electro-optic circuit.

Preferably, variable reflectance, electro-optic reflective mirror cell 246 is an electrochromic mirror cell that includes a transparent, front glass sheet 260 and a transparent, rear glass sheet 262 having a reflective coating 263 applied to its rear surface. Front glass 260 and reflective rear glass 262 are slightly offset relative to one another such that the upper and lower edges project for connection to appropriate metal connection strips (not shown). A variable light transmittance, electrochromic layer 264 is sandwiched in the space between the front glass 260 and rear of glass 262. The front surface of rear glass 262 and rear surface of front glass 260 each have a transparent electroconductive coating, such as indium tin oxide or doped tin oxide or the like, to conduct electricity across the full contact extent of electrochromic layer 264 from the connection strips secured at the offset top and bottom of the front and rear glass sheets. When controlled by printed circuit 252, electrical voltage is applied across electro-optic cell 246 between front glass 260 and rear glass 262 causing a variation in the transmittance of layer 264 such as darkening or opacity to reduce the light reflected by the reflective rear glass 262. Electrochromic layer 264 may, for example, be an electrochromic layer such as is described in commonly-assigned U.S. Pat. Nos. 5,140, 455 and 5,151,816 or in the following publications: N. R. Lynam, "Electrochromic Automotive Day/Night Mirrors", *SAE Technical Paper Series*, 870636 (1987); N. R. Lynam, "Smart Windows for Automobiles", *SAE Technical Paper Series*, 900419 (1990); N. R. Lynam and A. Agrawal, "Automotive Applications of Chromogenic Materials", *Large Area Chromogenics: Materials and Devices for Transmittance Control*, C. M. Lampert and C. G. Granquist, EDS., Optical Engineering Press, Washington (1990), the disclosures of which are each hereby incorporated by reference herein, or other as described above in assembly 10.

As also shown in FIGS. 17–19, a low level light emitting source 270, such as a light emitting diode as described above in connection with assemblies 10, 120, 150 and 180, and resistor 271 are connected to the vehicle electrical system through circuit board 252 by wire conductors 272 and frictionally telescoped into the top, open end of a hollow, cylindrical adapter 274 of the type described above in connection with the other embodiments of the present application. Adapter 274 includes an open lower end mounted in an aperture in the bottom periphery of case 232 through which low level light from light emitting source 270 is projected, such lower end optionally being closed by a suitable lens 276 as described in connections with the other embodiments above. Accordingly, low level light emitting source 270 may be fitted in the confines of a mirror case supporting an electro-optic mirror 246 as well as in mirror cases adapted to receive manual, day/night prismatic type reflective mirror elements or other electrically operated added features such as map or reading lights and compass displays.

With reference to FIGS. 20–22, the low level light emitting source of the present invention may also be incorporated in interior vehicle lamp assemblies such as that shown at 280. Such interior vehicle lamp assemblies include dome lamps, rail lamps, courtesy lamps, side door illumination lamps and their like. Lamp assembly 280 includes a front face plate or support 282, a lamp module 284 receiving a lamp socket 286 and incandescent, bayonet-type lamp or bulb 288 therein, the socket 286 and bulb 288 being telescoped within lamp module 284 as shown in FIG. 21. Lamp module 284 is secured to the rear surface of support 282 in registry with an opening 290 therein which receives a Fresnel or other type lens 292 snap-fitted into a shallow recess via appropriate openings around aperture 290 from the front side of the support. Thus, light from bulb 288 is directed through aperture 290 and focused or directed by lens 292 to the desired interior area of the vehicle. A double pole, single-throw switch 294 is mounted in registry with a second opening or aperture 296 adjacent light opening 290 in support 282 for access from the front of the support through opening 296. A protective housing or cover 298 is secured over both the lamp module 284 and switch 294, as shown in FIG. 21, for protection and containment of electrical wiring 299. As shown, socket 286 is connected to a plug receptacle 300 by electrical wiring 299, such wiring also extending to switch 294 in a conventionally known manner such that the switch can control the on/off operation of bulb 288. Plug receptacle 300 is mounted to extend though one side of housing 298.

As is also shown in FIGS. 20 and 21, a solid support surface 302 on the opposite side of aperture 290 from opening 296 is provided within a shallow recess 304. Surface 302 includes a small circular aperture 306 extending therethrough which, at the rear of the support surface, is surrounded by a cylindrical, hollow holder 308 into which a light emitting diode 310 of the type described above in connection with assemblies 10, 120, 150, 180 and 230 is telescopically and frictionally fitted just as in hollow adapter 94. As in those same assemblies described above, a resistor 312 of the type described at 92 above is connected in series with light emitting diode 310 to limit the voltage across the diode. A clear or transparent, molded plastic cover or lens 314 is snap-fitted into recess 304 to close aperture 306 yet allow the passage of low level light emanating therethrough from diode 310.

As shown in FIG. 22, appropriate electrical wiring is provided for connection of both incandescent bulb 288 and low level light emitting source 310 illustrated as an LED through receptacle 300 to the power system of the vehicle. It is preferred that the on/off switch 294 and incandescent bulb 288 be connected in series as are the light emitting diode 310 and resistor 312. In addition, switch and bulb 294, 288 are connected in parallel with the diode and resistor 310, 312 such that light emitting diode 310 will be continuously illuminated whenever the power system for the vehicle is switched on through the ignition switch as described above either when the ignition switch is moved to its "accessory on" position or its "ignition on" position. However, bulb 288 is further controlled such that when switch 294 is open, bulb 288 will not be illuminated. In such case, the low level light from diode 310 will be directed to the desired portions of the vehicle interior for illumination of instrumentation or controls. When switch 294 is closed, a low resistance path is provided through the filament of bulb 288 which illuminates bulb 288 to provide interior lighting. In such case, light from incandescent bulb 288 supplements the light from the diode 310 until switch 294 is again opened.

Accordingly, the low level light emitting source of the present invention can be located other than at an interior rearview mirror such as in an interior lamp assembly 280 which may be positioned in the headliner of the vehicle or over the passenger windows and used as a dome lamp, rail lamp or the like. In such case, the low light emitting source 310 and its series voltage limiting resistor 312 piggyback by convenient electrical connection to preexisting electrical wiring carrying ignition voltage to the interior lighting assembly or to other electrically operated accessories, components, and/or controls in the vehicle. As in the other assemblies described above, light emitting sources other than light emitting diodes can be used in mirror assembly 230 or interior lamp assembly 280 such as vacuum fluorescent sources, electroluminescent sources or semiconductor laser sources, all as described above. Furthermore, the non-incandescent, low level light emitting sources of the invention can be located in the vehicle at locations other than at mirror or interior lighting locations, but preferably in proximity to existing electrical wiring carrying ignition voltage to realize the benefits described above. The benefits of this invention are applicable in a variety of vehicles such as in convertibles equipped with lighted interior mirrors.

Accordingly, the present invention provides a non-incandescent, low level, low wattage light emitting source incorporating one of various types of emitting sources on an interior rearview mirror assembly or an interior vehicle lamp assembly to provide local area illumination taking unique advantage of the position of the rearview mirror assembly or interior lamp assembly when mounted in a vehicle. Rearview mirror assemblies and interior lighting typically mounted in the header region or in the upper windshield area of the vehicle can thus provide a desirable geographic location which provides a high-mount, typically electrically serviced, setting for the light emitting sources of this invention. Various forms of the invention can easily be accommodated to various different types of basic or added feature rearview mirror assemblies while the exact position of the low level light emitting source on the mirror assembly can be varied as desired from either the mirror case to the mounting arm to the overall support, such as for example, by means of a separate housing/pod. The emitting source provides a well defined pattern of light avoiding the need for separate reflectors, filters, collimators, diffusers or light stops, provides long life and pleasing color options, generates little heat and requires low power for operation but will typically outlast the operational lifetime rearview mirror assembly or interior lamp assembly itself and the vehicle in which it is mounted. Also, while generally, and preferably, illustrated herein as connected to the direct current (DC) voltage output of the vehicle ignition/battery system, the light emitting sources of this invention can, depending on their electrical characteristics and ancillary drive circuitry utilized, be operated by other electrical modes including pulsed direct current and alternating current voltage drives.

While several forms of the invention have been shown and described, other forms will now be apparent to those skilled in the art. Therefore, it will be understood that the embodiments shown in the drawings and described above are merely for illustrative purposes, and are not intended to limit the scope of the invention which is defined by the claims which follow.

The embodiments of the invention in which an exclusive property or privilege is claimed are as follows:

1. An interior rearview mirror assembly for mounting on a vehicle comprising:
    a mirror case including a reflective mirror element, said case including a peripheral portion having a bottom;
    a support for securing said assembly on the vehicle;
    a solid-state light source, said light source incorporated as part of said assembly and positioned for emitting light generally downwardly from said bottom when said assembly is mounted on the vehicle;
    said solid-state light source consisting of a grouping of multiple light emitting diodes; said grouping of multiple light emitting diodes including at least two light emitting diodes positioned to emit light directed to provide intense local illumination of a target location of the vehicle interior below said mirror assembly when said assembly is mounted on the vehicle and when said solid-state light source is electrically powered.

2. The mirror assembly of claim 1 wherein said grouping of multiple light emitting diodes comprises at least one light emitting diode having a luminous intensity of at least 500 mcd when operated at a forward current of 20 mA.

3. The mirror assembly of claim 1 wherein said grouping of multiple light emitting diodes comprises at least one light emitting diode having a luminous intensity of at least 700 mcd when operated at a forward current of 20 mA.

4. The mirror assembly of claim 1 wherein said grouping of multiple light emitting diodes comprises at least one light emitting diode having a luminous intensity in the range of about 500 mcd to about 7000 mcd when said solid-state light source is powered in the vehicle.

5. The mirror assembly of claim 1 wherein said grouping of multiple light emitting diodes comprises at least one light emitting diode operated at a forward voltage of at least about 1 volt.

6. The mirror assembly of claim 1 wherein said grouping of multiple light emitting diodes comprises at least one light emitting diode operated at a forward voltage of at least about 2 volts.

7. The mirror assembly of claim 1 wherein said grouping of multiple light emitting diodes comprises at least one light emitting diode operated at a forward voltage of at least about 5 volts.

8. The mirror assembly of claim 1 wherein said grouping of multiple light emitting diodes comprises at least one light emitting diode that emits light with a dominant wavelength within the range of about 530 nm to about 680 nm.

9. The mirror assembly of claim 1 wherein said grouping of multiple light emitting diodes comprises at least one light emitting diode that emits light having a color selected from the group consisting of green, orange, yellow, amber, reddish-orange, red and blue.

10. The mirror assembly of claim 1 wherein said grouping of multiple light emitting diodes comprises at least one light emitting diode formed from a material including at least one of aluminum, indium, gallium, arsenic and phosphorous.

11. The mirror assembly of claim 9 wherein said grouping of multiple light emitting diodes comprises at least one light emitting diode formed from a material including at least one of aluminum, indium, gallium, arsenic and phosphorous.

12. The mirror assembly of claim 1 wherein said grouping of multiple light emitting diodes comprises at least one light emitting diode operated at a current less than about 200 mA.

13. The mirror assembly of claim 1 wherein said grouping of multiple light emitting diodes comprises at least one light emitting diode operated at a current less than about 100 mA.

14. The mirror assembly of claim 1 wherein said grouping of multiple light emitting diodes comprises at least one light emitting diode operated at a current less than about 50 mA.

15. The mirror assembly of claim 1 wherein said grouping of multiple light emitting diodes comprises at least one light emitting diode operated at a current within the range of about 20 mA to about 100 mA.

16. The mirror assembly of claim 1 wherein said grouping of multiple light emitting diodes comprises at least one light emitting diode providing illumination of between about 0.2 and 4.0 lux at a distance of about 22 to 26 inches from said diode.

17. The mirror assembly of claim 1 wherein the vehicle includes a windshield, said support being adapted for connection to the windshield for mounting said assembly on the vehicle.

18. The mirror assembly of claim 1 wherein the vehicle includes a windshield and a header area adjacent the windshield, said support being adapted for connection to the header area of the vehicle for mounting said assembly on the vehicle.

19. The mirror assembly of claim 1 wherein said reflective mirror element comprises a prismatic rearview mirror element.

20. The mirror assembly of claim 1 wherein said reflective mirror element comprises an electro-optic rearview mirror element.

21. The mirror assembly of claim 20 wherein said reflective mirror element comprises an electrochromic rearview mirror element.

22. The mirror assembly of claim 1 wherein said solid-state light source comprises a lens.

23. The mirror assembly of claim 22 wherein said lens comprises one of a Fresnel lens, a binary optic, a refractive optic and a holographic optic.

24. The mirror assembly of claim 22 wherein said lens comprises a plastic lens.

25. The mirror assembly of claim 1 wherein said multiple light emitting diodes of said grouping are electrically connected in series.

26. An interior rearview mirror assembly for mounting on a vehicle comprising:

a mirror case including a reflective mirror element, said case including a peripheral portion having a bottom;

a support for securing said assembly on the vehicle;

a solid-state light source, said light source incorporated as part of said assembly and positioned for emitting light generally downwardly from said bottom when said assembly is mounted on the vehicle;

said solid-state light source consisting of a grouping of multiple light emitting diodes; said grouping of multiple light emitting diodes including at least two light emitting diodes positioned to emit light directed to provide intense local illumination of a target location of the vehicle interior below said mirror assembly when said assembly is mounted on the vehicle and when said solid-state light source is electrically powered; said multiple light emitting diodes of said grouping being electrically connected in series; said grouping being electrically connected by a series resistor to the vehicle ignition/battery voltage when said solid-state light source is electrically powered in the vehicle.

27. The mirror assembly of claim 26 wherein said series resistor has a resistance of less than about 1500 ohms and greater than about 100 ohms.

28. The mirror assembly of claim 26 wherein said series resistor has a resistance within the range of between about 1000 and 200 ohms.

29. An interior rearview mirror assembly for mounting on a vehicle comprising:

a mirror case including a reflective mirror element, said case including a peripheral portion having a bottom;

a support for securing said assembly on the vehicle;

a solid-state light source, said light source incorporated as part of said assembly and positioned for emitting light generally downwardly from said bottom when said assembly is mounted on the vehicle;

said solid-state light source consisting of a grouping of multiple light emitting diodes; said grouping of multiple light emitting diodes including at least two light emitting diodes positioned to emit light directed to provide intense location illumination of a target location of the vehicle interior below said mirror assembly when said assembly is mounted on the vehicle and when said solid-state light source is electrically powered; said solid-state light source being electrically connected by a series resistor to the vehicle ignition/battery voltage when said solid-state light source is electrically powered in the vehicle.

30. The mirror assembly of claim 29 wherein said series resistor has a resistance of less than about 1500 ohms and greater than about 100 ohms.

31. The mirror assembly of claim 29 wherein said series resistor has a resistance within the range of between about 1000 and 200 ohms.

32. The mirror assembly of claim 1 wherein said solid-state light source is connected in series to the power system of the vehicle through a switch.

33. An interior rearview mirror assembly for mounting on a vehicle comprising:

a mirror case including a reflective mirror element, said case including a peripheral portion having a bottom;

a support for securing said assembly on the vehicle;

a solid-state light source, said light source incorporated as part of said assembly and positioned for emitting light generally downwardly from said bottom when said assembly is mounted on the vehicle;

said solid-state light source consisting of a grouping of multiple light emitting diodes; said grouping of multiple light emitting diodes including at least two light emitting diodes positioned to emit light directed to provide intense location illumination of a target location of the vehicle interior below said mirror assembly when said assembly is mounted on the vehicle and when said solid-state light source is electrically powered; said solid-state light source being connected in series to the power system of the vehicle through a switch; said switch further comprising a rheostat/dimmer switch.

34. The mirror assembly of claim 19 wherein said grouping of multiple light emitting diodes consumes a current less than about 200 mA when said solid-state light source is mounted on the vehicle and operated.

35. The mirror assembly of claim 34 wherein said grouping of multiple light emitting diodes consumes a current less than about 100 mA when said solid-state light source is mounted on the vehicle and operated.

36. The mirror assembly of claim 35 wherein said grouping of multiple light emitting diodes consumes a current less than about 50 mA when said solid-state light source is mounted on the vehicle and operated.

37. An interior rearview mirror assembly for mounting on a vehicle comprising:

a mirror case including a reflective mirror element, said case including a peripheral portion having a bottom;

a support for securing said assembly on the vehicle;

a solid-state light source, said light source incorporated as part of said assembly and positioned for emitting light generally downwardly from said bottom when said assembly is mounted on the vehicle;

said solid-state light source consisting of a grouping of multiple light emitting diodes; said grouping of multiple light emitting diodes including at least two light emitting diodes positioned to emit light directed to provide intense location illumination of a target location of the vehicle interior below said mirror assembly when said assembly is mounted on the vehicle and when said solid-state light source is electrically powered; said grouping of multiple light emitting diodes consuming a current less than about 200 mA when said solid-state light source is mounted on the vehicle and operated.

38. The mirror assembly of claim 37 wherein said grouping of multiple light emitting diodes consumes a current less than about 100 mA when said solid-state light source is mounted on the vehicle and operated.

39. The mirror assembly of claim 38 wherein said grouping of multiple light emitting diodes consumes a current less than about 50 mA when said solid-state light source is mounted on the vehicle and operated.

* * * * *

UNITED STATES PATENT AND TRADEMARK OFFICE
CERTIFICATE OF CORRECTION

PATENT NO. : 6,139,172
DATED : October 31, 2000
INVENTOR(S) : Bos et al.

It is certified that error appears in the above-identified patent and that said Letters Patent is hereby corrected as shown below:

Column 1,
Line 56, "identified" should be -- unidentified --.

Column 2,
Line 29, "or by separately" should be -- or be separately --.

Column 3,
Line 9, "known vehicles" should be -- known vehicle --.
Line 34, "without" should be -- within --.
Line 36, "without" should be -- within --.
Line 38, "also be provide" should be -- also provide --.

Column 4,
Lines 6-7, "of the FIGS." should be -- of FIGS. --.

Column 5,
Line 35, "at typically" should be -- a typically --.
Line 48, "common assigned" should be -- commonly assigned --.
Line 53, "acetal end" should be -- acetal and --.
Line 67, "side or" should be -- side of --.

Column 6,
Line 11, "path. from" should be -- path from --.

Column 7,
Lines 15-16, "under designation" should be -- under the designation --.

Column 8,
Line 32, "1 to about 5 volts" should be -- 1 volt to about 5 volts --.

Column 9,
Lines 43-44, "In this version, 60' (FIG. 9) general" should be -- In this version 60' (FIG. 9), general --.
Lines 66-67, "90', 90a' telescopingly" should be -- 90', 90a' is telescopingly --.

Column 10,
Line 23, "connected" should be -- connection --.
Line 50, "described in" should be -- described above in --.

UNITED STATES PATENT AND TRADEMARK OFFICE
CERTIFICATE OF CORRECTION

PATENT NO. : 6,139,172
DATED : October 31, 2000
INVENTOR(S) : Bos et al.

It is certified that error appears in the above-identified patent and that said Letters Patent is hereby corrected as shown below:

Column 11,
Line 23, "if preferably" should be -- is preferably --.
Line 59, "DISPLAY invented" should be -- DISPLAY, invented --.

Column 12,
Line 12, "186" should be -- 184 --.
Line 28, "digital compass" should be -- digital display compass --.
Line 32, "descried" should be -- described --.
Line 50, "described" should be -- described --.
Line 64, "above;" should be -- above, --.

Column 14,
Line 22, "connections" should be -- connection --.

Column 15,
Line 27, "provide interior" should be -- provide general interior --.

Column 16,
Lines 66-67, "of at least about 5 volts" should be -- less than about 5 volts --.

Column 18,
Line 39, "location" should be -- local --.

Column 19,
Line 3, "location" should be -- local --.

Column 20,
Line 9, "location" should be -- local --.

Signed and Sealed this

Twenty-first Day of January, 2003

JAMES E. ROGAN
*Director of the United States Patent and Trademark Office*